United States Patent
Lerner et al.

(10) Patent No.: US 10,466,494 B2
(45) Date of Patent: Nov. 5, 2019

(54) REVERSE INTERLEAVING FOR LASER LINE GENERATORS

(71) Applicant: nLIGHT, Inc., Vancouver, WA (US)

(72) Inventors: Scott A. Lerner, Los Angeles, CA (US); R. Kirk Price, Seattle, WA (US); Scott R. Karlsen, Battle Ground, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/384,059

(22) Filed: Dec. 19, 2016

(65) Prior Publication Data
US 2017/0176758 A1 Jun. 22, 2017

Related U.S. Application Data

(60) Provisional application No. 62/269,794, filed on Dec. 18, 2015.

(51) Int. Cl.
*G02B 27/09* (2006.01)

(52) U.S. Cl.
CPC ..... *G02B 27/0927* (2013.01); *G02B 27/0916* (2013.01); *G02B 27/0955* (2013.01); *G02B 27/0977* (2013.01); *G02B 27/0994* (2013.01)

(58) Field of Classification Search
CPC ............ G02B 27/0927; G02B 27/0916; G02B 27/0955; G02B 27/0977; G02B 27/0994; G02B 27/30
See application file for complete search history.

(56) References Cited

U.S. PATENT DOCUMENTS

| | | | | |
|---|---|---|---|---|
| 4,138,190 A | * | 2/1979 | Bryngdahl | G02B 27/42 359/15 |
| 4,252,403 A | * | 2/1981 | Salisbury | G02B 6/262 385/124 |

(Continued)

FOREIGN PATENT DOCUMENTS

| | | |
|---|---|---|
| CN | 1508844 | 6/2004 |
| CN | 1531023 | 9/2004 |

(Continued)

OTHER PUBLICATIONS

Kotlyar et al., Asymmetric Bessel-Gauss beams, J. Opt. Soc. Am A, V. 31, N. 9, 2014, p. 1977.*

(Continued)

*Primary Examiner* — Peter Radkowski
(74) *Attorney, Agent, or Firm* — Klarquist Sparkman, LLP

(57) ABSTRACT

An apparatus includes beam shearing optics situated to receive a collimated beam and to shear the collimated beam along a first direction so as to form a plurality of adjacent collimated beam portions, and homogenization optics situated to receive and homogenize the adjacent collimated beam portions along at least the first direction so as to produce a homogenized output beam. A method includes shearing a collimated beam having a beam parameter product (bpp) along an axis so as to form a plurality of sheared collimated beam portions, and arranging the sheared collimated beam portions adjacent to each other so that a line beam having a length and thickness that is formed with the light from the sheared collimated beam portions has a lower bpp associated with the line beam thickness than the bpp of the collimated beam along the axis.

20 Claims, 8 Drawing Sheets

(56) References Cited

U.S. PATENT DOCUMENTS

| | | | | |
|---|---|---|---|---|
| 4,266,851 A * | 5/1981 | Salisbury | G02B 6/2551 | 250/227.24 |
| 4,475,027 A * | 10/1984 | Pressley | B23K 26/0732 | 219/121.6 |
| 4,498,951 A | 2/1985 | Tamura et al. | | |
| 5,081,636 A | 1/1992 | Bishop | | |
| 5,153,773 A * | 10/1992 | Muraki | G02B 3/0056 | 359/211.1 |
| 5,224,200 A * | 6/1993 | Rasmussen | G02B 5/005 | 372/107 |
| 5,256,164 A * | 10/1993 | Mooradian | H01S 3/0627 | 372/21 |
| 5,388,114 A * | 2/1995 | Zarrabi | H01S 3/109 | 359/328 |
| 5,463,497 A * | 10/1995 | Muraki | G02B 3/0056 | 359/618 |
| 5,475,415 A * | 12/1995 | Noethen | B41J 2/45 | 347/238 |
| 5,864,430 A * | 1/1999 | Dickey | B23K 26/073 | 219/121.69 |
| 5,986,807 A * | 11/1999 | Fork | G02B 5/1876 | 359/566 |
| 6,072,184 A * | 6/2000 | Okino | H01J 37/3045 | 250/491.1 |
| 6,433,301 B1 * | 8/2002 | Dunsky | B23K 26/073 | 219/121.67 |
| 6,451,631 B1 | 9/2002 | Grigoropoulos et al. | | |
| 6,483,973 B1 * | 11/2002 | Mazzarese | H01S 3/06708 | 372/6 |
| 6,496,301 B1 * | 12/2002 | Koplow | G02B 6/14 | 359/337 |
| 6,542,665 B2 * | 4/2003 | Reed | A61B 5/0084 | 359/652 |
| 6,639,177 B2 * | 10/2003 | Ehrmann | B23K 26/032 | 219/121.68 |
| 6,671,293 B2 * | 12/2003 | Kopp | G02B 6/02085 | 372/39 |
| 6,777,645 B2 * | 8/2004 | Ehrmann | B23K 26/032 | 219/121.7 |
| 6,917,742 B2 * | 7/2005 | Po | G02B 6/032 | 385/123 |
| 6,989,508 B2 * | 1/2006 | Ehrmann | B23K 26/032 | 219/121.73 |
| 7,116,887 B2 * | 10/2006 | Farroni | C03B 37/01217 | 385/123 |
| 7,148,447 B2 * | 12/2006 | Ehrmann | B23K 26/032 | 219/121.68 |
| 7,157,661 B2 * | 1/2007 | Amako | B23K 26/0608 | 219/121.73 |
| 7,184,630 B2 * | 2/2007 | Kwon | G02B 6/30 | 385/49 |
| 7,257,293 B1 * | 8/2007 | Fini | G02B 6/02 | 385/123 |
| 7,317,857 B2 * | 1/2008 | Manyam | G02B 6/02033 | 385/126 |
| 7,359,604 B2 * | 4/2008 | Po | G02B 6/032 | 385/123 |
| 7,382,389 B2 * | 6/2008 | Cordingley | B23K 26/032 | 219/121.68 |
| 7,394,476 B2 * | 7/2008 | Cordingley | B23K 26/032 | 219/121.6 |
| 7,421,175 B2 * | 9/2008 | Varnham | H01S 3/06708 | 372/6 |
| 7,537,395 B2 * | 5/2009 | Savage-Leuchs | G02B 6/4296 | 372/6 |
| 7,764,854 B2 * | 7/2010 | Fini | G02B 6/02009 | 385/123 |
| 7,783,149 B2 * | 8/2010 | Fini | G02B 6/02009 | 372/6 |
| 7,876,495 B1 * | 1/2011 | Minelly | C03B 37/0122 | 359/341.1 |
| 7,910,499 B2 * | 3/2011 | Jennings | H01L 21/67115 | 438/473 |
| 7,920,767 B2 * | 4/2011 | Fini | G02B 6/02023 | 385/123 |
| 7,924,500 B1 * | 4/2011 | Minelly | G02B 6/023 | 359/341.1 |
| 7,955,905 B2 * | 6/2011 | Cordingley | B23K 26/032 | 219/121.69 |
| 7,955,906 B2 * | 6/2011 | Cordingley | B23K 26/032 | 219/121.6 |
| 8,217,304 B2 * | 7/2012 | Cordingley | B23K 26/032 | 219/121.76 |
| 8,288,683 B2 * | 10/2012 | Jennings | B23K 26/0613 | 117/204 |
| 8,362,391 B2 * | 1/2013 | Partlo | B23K 26/0732 | 219/121.6 |
| 8,395,084 B2 * | 3/2013 | Tanaka | B23K 26/0738 | 219/121.6 |
| 8,509,577 B2 * | 8/2013 | Liu | G02B 6/32 | 385/27 |
| 8,526,110 B1 * | 9/2013 | Honea | H01S 3/06791 | 359/556 |
| 8,711,471 B2 * | 4/2014 | Liu | G02B 6/14 | 359/337 |
| 8,728,591 B2 * | 5/2014 | Inada | G02B 1/04 | 428/1.31 |
| 8,755,660 B1 * | 6/2014 | Minelly | C03B 37/0122 | 359/341.1 |
| 8,781,269 B2 * | 7/2014 | Huber | B23K 26/073 | 385/147 |
| 8,809,734 B2 * | 8/2014 | Cordingley | B23K 26/032 | 219/121.76 |
| 8,835,804 B2 * | 9/2014 | Farmer | G02B 19/0052 | 219/121.73 |
| 8,953,914 B2 * | 2/2015 | Genier | G02B 6/32 | 385/33 |
| 9,140,873 B2 * | 9/2015 | Minelly | C03B 37/0122 | |
| 9,158,066 B2 * | 10/2015 | Fini | G02B 6/0283 | |
| 9,207,395 B2 * | 12/2015 | Fini | G02B 6/02009 | |
| 9,213,153 B2 * | 12/2015 | Morioka | G02B 6/4214 | |
| 9,217,825 B2 * | 12/2015 | Ye | G02B 6/02 | |
| 9,250,390 B2 * | 2/2016 | Muendel | G02B 6/32 | |
| 9,310,560 B2 * | 4/2016 | Chann | G02B 6/2706 | |
| 9,322,989 B2 * | 4/2016 | Fini | G02B 6/0288 | |
| 9,325,151 B1 * | 4/2016 | Fini | H01S 3/102 | |
| 9,339,890 B2 * | 5/2016 | Woods | B23K 26/06 | |
| 9,366,887 B2 * | 6/2016 | Tayebati | G02F 1/295 | |
| 9,397,466 B2 * | 7/2016 | McComb | H01S 3/06704 | |
| 9,442,252 B2 * | 9/2016 | Genier | G02B 6/32 | |
| 9,507,084 B2 * | 11/2016 | Fini | G02B 6/0285 | |
| 2002/0050488 A1 | 5/2002 | Nikitin et al. | | |
| 2002/0136507 A1 | 9/2002 | Musk | | |
| 2002/0146202 A1 * | 10/2002 | Reed | A61B 5/0084 | 385/34 |
| 2003/0095578 A1 * | 5/2003 | Kopp | G02B 6/02085 | 372/6 |
| 2003/0118305 A1 * | 6/2003 | Reed | A61B 5/0084 | 385/124 |
| 2003/0219208 A1 * | 11/2003 | Kwon | G02B 6/30 | 385/49 |
| 2004/0011772 A1 | 1/2004 | Okumura | | |
| 2004/0119955 A1 | 6/2004 | Koichiro | | |
| 2004/0198028 A1 | 10/2004 | Tanaka et al. | | |
| 2004/0208464 A1 * | 10/2004 | Po | G02B 6/032 | 385/123 |
| 2005/0059265 A1 | 3/2005 | Im | | |
| 2005/0185892 A1 * | 8/2005 | Kwon | G02B 6/30 | 385/49 |
| 2005/0265678 A1 * | 12/2005 | Manyam | G02B 6/02033 | 385/127 |
| 2005/0272185 A1 | 12/2005 | Seki et al. | | |
| 2006/0019474 A1 | 1/2006 | Inui et al. | | |
| 2006/0072632 A1 * | 4/2006 | Flanders | G01J 1/4257 | 372/20 |
| 2006/0105585 A1 * | 5/2006 | Jennings | H01L 21/67115 | 438/795 |
| 2006/0254500 A1 | 11/2006 | Im et al. | | |

(56) References Cited

U.S. PATENT DOCUMENTS

| | | | |
|---|---|---|---|
| 2006/0291788 A1* | 12/2006 | Po | G02B 6/032 385/123 |
| 2007/0104438 A1* | 5/2007 | Varnham | H01S 3/06708 385/126 |
| 2007/0147751 A1* | 6/2007 | Fini | G02B 6/02009 385/123 |
| 2007/0178674 A1* | 8/2007 | Imai | B23K 26/0604 438/487 |
| 2007/0296966 A1 | 12/2007 | Benicewicz et al. | |
| 2008/0087895 A1 | 4/2008 | Han et al. | |
| 2009/0034059 A1* | 2/2009 | Fini | G02B 6/02023 359/341.3 |
| 2009/0059353 A1* | 3/2009 | Fini | G02B 6/02009 359/341.3 |
| 2009/0127477 A1* | 5/2009 | Tanaka | B23K 26/0738 250/492.22 |
| 2009/0129237 A1* | 5/2009 | Chen | G02B 27/0905 369/112.17 |
| 2009/0152247 A1* | 6/2009 | Jennings | B23K 26/0613 219/121.61 |
| 2009/0173724 A1 | 7/2009 | Ogino et al. | |
| 2009/0202813 A1* | 8/2009 | Itami | B01D 67/0006 428/319.3 |
| 2010/0125356 A1* | 5/2010 | Shkolnik | G06T 1/00 700/98 |
| 2010/0277804 A1 | 11/2010 | Galvanauskas et al. | |
| 2010/0320086 A1 | 12/2010 | Lee et al. | |
| 2011/0163077 A1* | 7/2011 | Partlo | B23K 26/0732 219/121.66 |
| 2011/0188016 A1 | 8/2011 | De Jager et al. | |
| 2011/0200802 A1 | 8/2011 | Sheping et al. | |
| 2011/0248005 A1* | 10/2011 | Briand | B23K 26/06 219/121.72 |
| 2012/0002919 A1* | 1/2012 | Liu | G02B 6/32 385/27 |
| 2012/0012594 A1 | 1/2012 | Boegli et al. | |
| 2012/0028399 A1 | 2/2012 | Moslehi et al. | |
| 2012/0168411 A1* | 7/2012 | Farmer | G02B 19/0052 219/121.67 |
| 2012/0197114 A1 | 8/2012 | Emelianov et al. | |
| 2012/0260847 A1 | 10/2012 | Van Der Wilt | |
| 2013/0148925 A1* | 6/2013 | Muendel | G02B 6/32 385/27 |
| 2013/0223792 A1* | 8/2013 | Huber | B23K 26/073 385/18 |
| 2013/0251324 A1* | 9/2013 | Fini | G02B 6/02009 385/124 |
| 2013/0343703 A1* | 12/2013 | Genier | G02B 6/32 385/33 |
| 2014/0071421 A1 | 3/2014 | De Jager et al. | |
| 2014/0133802 A1* | 5/2014 | Morioka | G02B 6/4286 385/33 |
| 2014/0187055 A1 | 7/2014 | Martinsen et al. | |
| 2014/0268310 A1* | 9/2014 | Ye | G02B 6/02 359/341.1 |
| 2014/0334788 A1* | 11/2014 | Fini | G02B 6/0283 385/124 |
| 2015/0125114 A1* | 5/2015 | Genier | G02B 6/32 385/35 |
| 2015/0125115 A1* | 5/2015 | Genier | G02B 6/32 385/35 |
| 2015/0293300 A1* | 10/2015 | Fini | G02B 6/0285 385/124 |
| 2015/0316716 A1* | 11/2015 | Fini | G02B 6/02009 385/124 |
| 2016/0013607 A1* | 1/2016 | McComb | H01S 3/06704 372/6 |
| 2016/0320685 A1* | 11/2016 | Tayebati | G02F 1/295 |

FOREIGN PATENT DOCUMENTS

| | | |
|---|---|---|
| CN | 1863635 | 11/2006 |
| CN | 101160646 | 4/2008 |
| CN | 101162690 A | 4/2008 |
| JP | 2002-301583 | 10/2002 |
| JP | 2004-039660 | 2/2004 |
| JP | 2008-098595 | 4/2008 |
| JP | 2011-011972 | 1/2011 |
| JP | 2011-124476 | 6/2011 |
| JP | 5073260 | 11/2012 |
| KR | 10-1991-0007153 | 9/1991 |
| KR | 10-2003-0095313 | 12/2003 |
| KR | 10-2009-0017084 | 2/2009 |
| KR | 10-2011-0044335 | 4/2011 |
| WO | WO 2007149208 | 12/2007 |
| WO | WO 2012136434 | 10/2012 |

OTHER PUBLICATIONS

Sun et al., Optical Surface Transformation: Changing the optical surface by homogeneous optic-null medium at will, Nature, Scientific Reports, 5:16032, 2015.*
Ghasemi et al., Beam shaping design for coupling high power diode laser stack to fiber, Applied Optics, vol. 50, No. 18, 2011, p. 2927.*
IDEX—How to Select a Beamsplitter—Optics & Photonics Marketplace www.marketplace.idexop.com, available at https://www.cvilaseroptics.com/file/general/beamSplitters.pdf ("Created: Jan. 8, 2014").*
Price, Karlsen, nLIGHT et al., High Brightness Fiber Coupled Pump Laser Development, High-Power Diode Laser Technology and Applications VIII, Proc. of SPIE, vol. 7583, 758308, 2010.*
Han et al., Reshaping collimated laser beams with a Gaussian profile to uniform profiles, Applied Optics, vol. 22, No. 22, p. 3644, 1983.*
Huang et al., Double-cutting beam shaping technique for high-power diode laser area light source, Optical Engineering 52(1), 106108, 2013.*
Sanchez-Rubio et al., Wavelength Beam Combining for Power and Brightness Scaling of Laser Systems, Lincoln Laboratory Journal, vol. 22, No. 2, p. 52, 2014.*
Romero et al., Lossless laser beam shaping, J. Opt. Soc. Am. A, vol. 13, No. 4, p. 751, 1996.*
Michael A. Golub, Laser Beam Splitting by Diffractive Optics, Optics and Photonics News, 2004.*
Qirong Xiao, Xiao Chen, Haichui Ren, Ping Yan, and Mali Gong, "Fiber coupler for mode selection and high-efficiency pump coupling," Opt. Lett. 38, 1170-1172 (2013).*
Stefano Longhi and Davide Janner, Self-focusing and nonlinear periodic beams in parabolic index optical fibres, Published May 4, 2004 o IOP Publishing Ltd Journal of Optics B: Quantum and Semiclassical Optics, vol. 6, No. 5.*
Sandia National Laboratories—Brochure (POC—D.A.V. Kliner); "Mode-Filtered Fiber Amplifier," 2007.*
Jeffrey P. Koplow, Dahv A. V. Kliner, and Lew Goldberg, "Single-mode operation of a coiled multimode fiber amplifier," Opt. Lett. 25, 442-444 (2000).*
Kliner D.A.V., Bambha R.P., Do B.T., Farrow R.L., Feve J.-P., Fox B.P., Hadley G.R., Wien G., Overview of Sandia's fiber laser program (2008) Proceedings of SPIE—The International Society for Optical Engineering, 6952, art. No. 695202.*
J. M. O. Daniel, J. S. P. Chan, J. W. Kim, J. K. Sahu, M. Ibsen, and W. A. Clarkson, "Novel technique for mode selection in a multimode fiber laser," Opt. Express 19, 12434-12439 (2011).*
J. M. Daniel, J. S. Chan, J. W. Kim, M. Ibsen, J. Sahu, and W. A. Clarkson, "Novel Technique for Mode Selection in a Large-Mode-Area Fiber Laser," in Conference on Lasers and Electro-Optics 2010, OSA Technical Digest (CD) (Optical Society of America, 2010), paper CWC5.*
John M. Fini and Jeffrey W. Nicholson, "Bend compensated large-mode-area fibers: achieving robust single-modedness with transformation optics," Opt. Express 21, 19173-19179 (2013).*
John M. Fini, "Large mode area fibers with asymmetric bend compensation," Opt. Express 19, 21866-21873 (2011).*
John M. Fini, "Bend-compensated design of large-mode-area fibers," Opt. Lett. 31, 1963-1965 (2006).*
Delmdahl, "The Excimer Laser: Precision Engineering," Nature Photonics 4:286 (May 2010).

(56) References Cited

OTHER PUBLICATIONS

"The Digital Display Revolution: Built on Excimer Laser Annealing," available at http://www.coherent.com/downloads/e-newsletter-Whitepaper-FPD-rev2.pdf prior to Jan. 18, 2013 (4 pages).
Decision of Rejection from Chinese Patent Application No. 201410097021.X, dated Dec. 22, 2016, 23 pages (with English translation).
Decision of Rejection from Korean Patent Application No. 10-2014-0029473, dated Mar. 20, 2017, 6 pages (with English translation).
Decision of Rejection from Korean Patent Application No. 10-2014-0030097, dated Mar. 27, 2017, 6 pages (with English translation).
First Office Action from Chinese Patent Application No. 201410097021.X, dated Jul. 3, 2015, 24 pages (with English translation).
First Office Action from Chinese Patent Application No. 201410095844.9, dated Apr. 5, 2016, 18 pages (with English translation).
Notice of Preliminary Rejection from Korean Patent Application No. 10-2014-0029473, dated Jul. 27, 2015, 12 pages (with English translation).
Notice of Preliminary Rejection from Korean Patent Application No. 10-2014-0030097, dated Jan. 12, 2016, 14 pages (with English translation).
Notice of Preliminary Rejection from Korean Patent Application No. 10-2014-0029473, dated May 27, 2016, 14 pages (with English translation).
Notice of Preliminary Rejection from Korean Patent Application No. 10-2014-0030097, dated Jul. 25, 2016, 14 pages (with English translation).
Official Letter from Taiwan Patent Application No. 103105391, dated Jun. 23, 2015, 13 pages (with English translation).
Official Letter from Taiwan Patent Application No. 103105390, dated Dec. 15, 2015, 17 pages (with English translation).
Official Action from Taiwan Patent Application No. 103105391, dated Feb. 23, 2016, 11 pages (with English translation).
Official Letter from Taiwan Patent Application No. 103105391, dated Dec. 29, 2016, 9 pages (with English translation).
Second Office Action from Chinese Patent Application No. 201410097021.X, dated Apr. 22, 2016, 21 pages (with English translation).
Second Office Action from Chinese Patent Application No. 201410095844.9, dated Nov. 2, 2016, 3 pages (no English translation available).
Third Office Action from Chinese Patent Application No. 201410095844.9, dated Mar. 3, 2017, 3 pages (no English translation available).
Office Action from Korea Patent Application No. 10-2014-0029473, (w/English translation) dated Jul. 14, 2017, 7 pages.
Office Action (w/English translation) from Korea Patent Application No. 10-2014-0030097, dated Aug. 3, 2017, 8 pages.
Fourth Office Action from Chinese Patent Application No. 201410095844.9 (no English translation), dated Jul. 4, 2017, 3 pages.
Office Action (with English Translation) received in Korea Application No. 10-2017-0133619, dated Dec. 19, 2017, 16 pages.
Second Notification of Reexamination (with English translation) from Chinese Application No. 201410097021.X, dated Jan. 15, 2018, 12 pages.
Notification of Reexamination (w/ English translation) received in Chinese Application No. 201410097021.X, dated Aug. 30, 2017, 27 pages.
Decision of Rejection and Decision of Refusal of Amendment from Korean Patent Application No. 10-2017-0133619, dated Nov. 12, 2018, 5 pages (with English translation).
Third Office Action from Chinese Patent Application No. 201410097021.X, dated Sep. 19, 2018, 9 pages (with English translation).
Decision of Rejection from Korean Patent Application No. 10-2017-0133619, dated Jul. 11, 2018, 6 pages (with English translation).

* cited by examiner

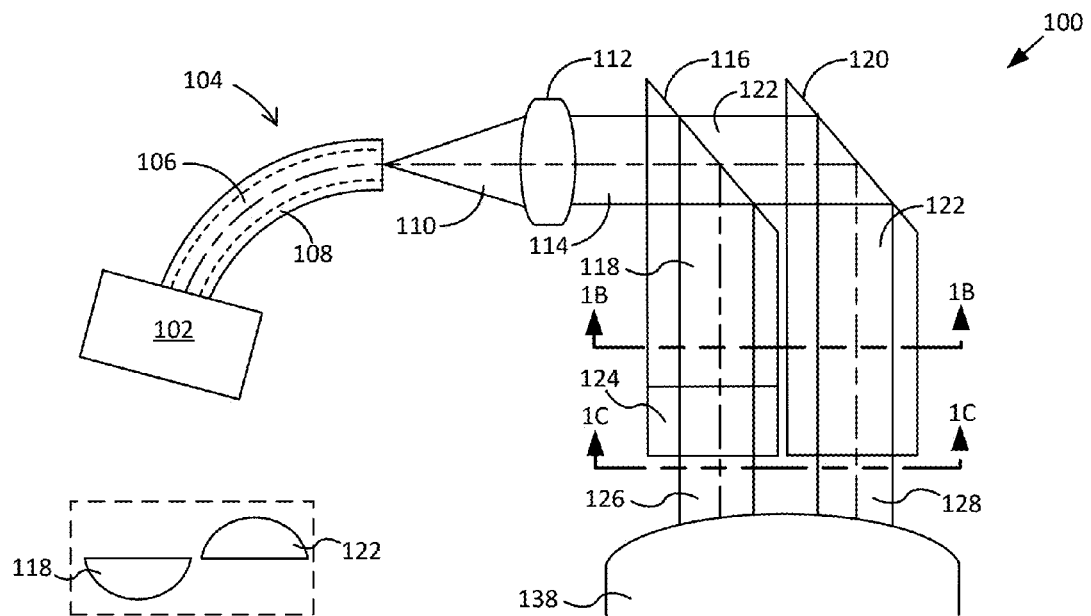
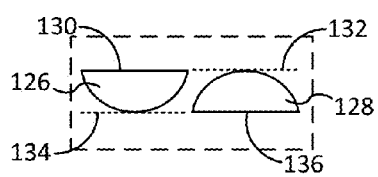
FIG. 1B
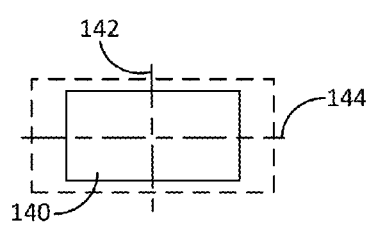
FIG. 1C
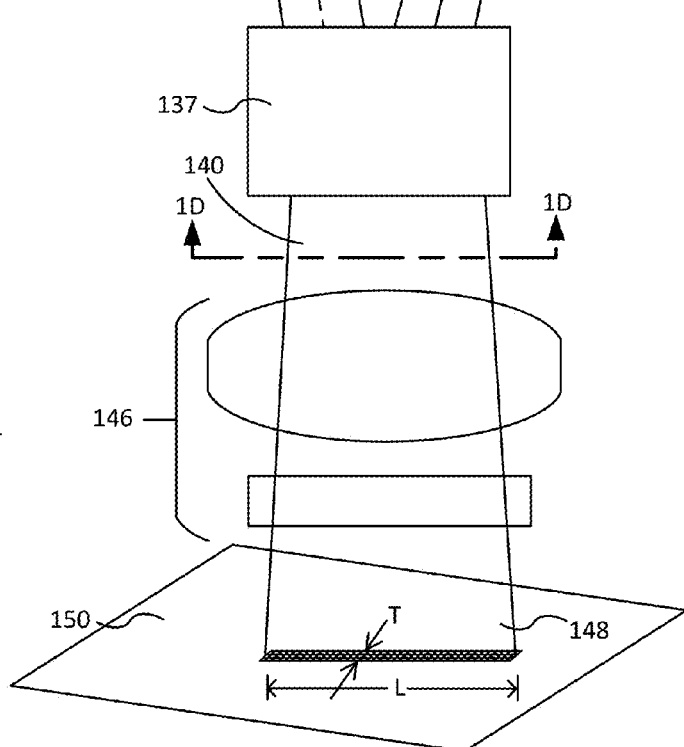
FIG. 1D
FIG. 1A

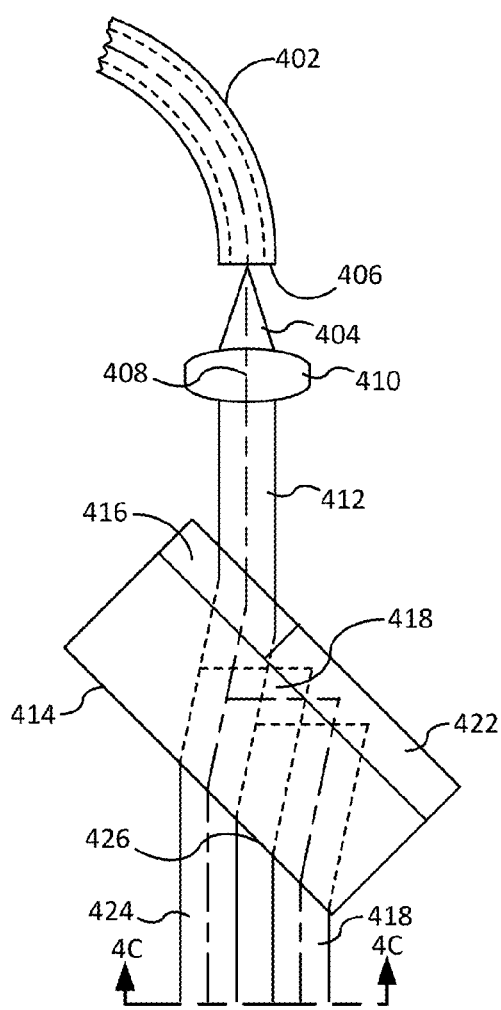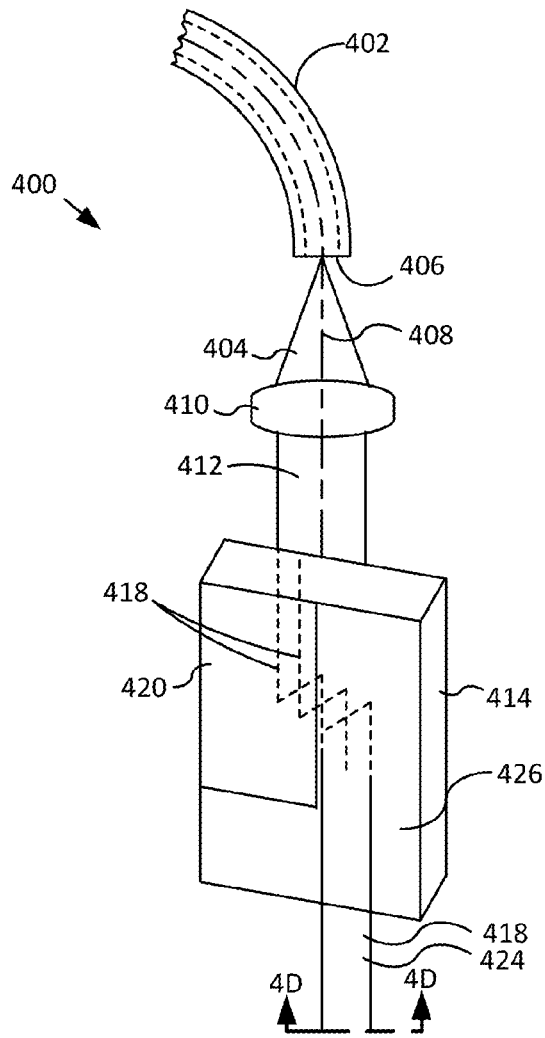
FIG. 4A
FIG. 4B
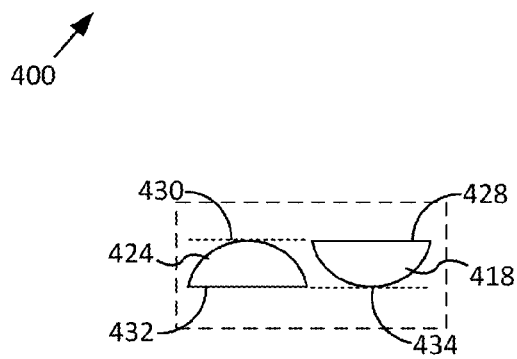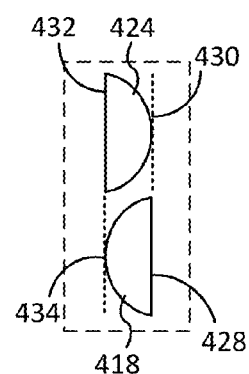
FIG. 4C
FIG. 4D

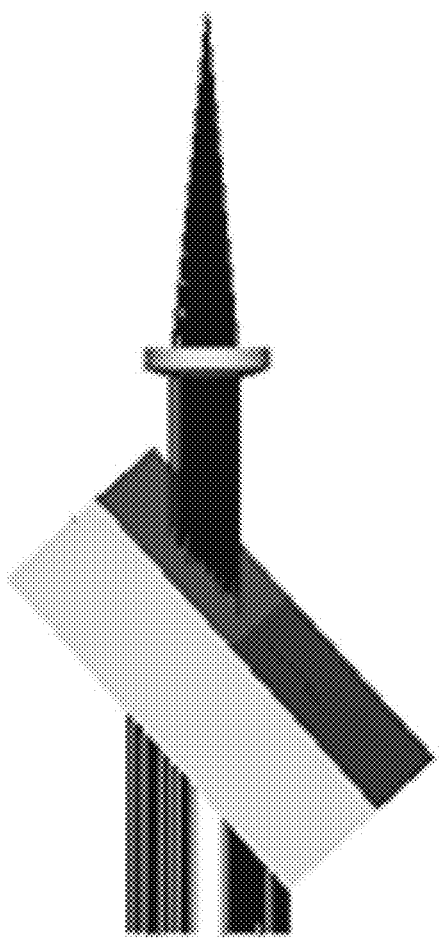 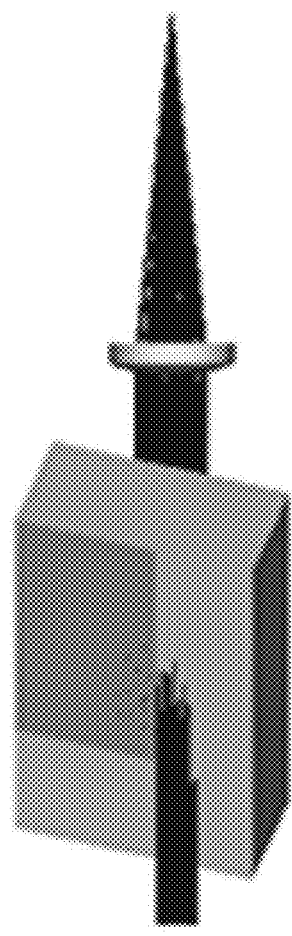
FIG. 4E    FIG. 4F
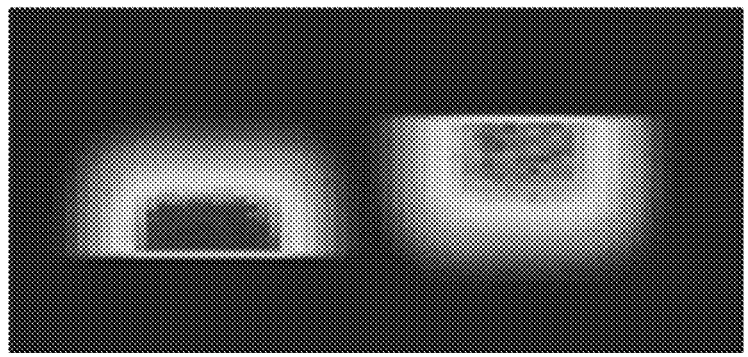
FIG. 4G

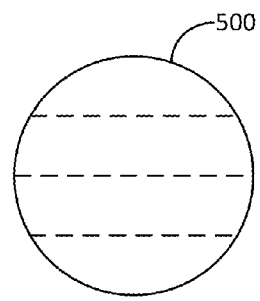 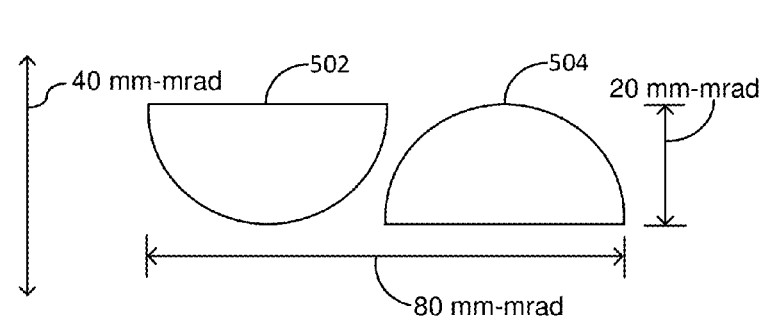
FIG. 5A  FIG. 5B
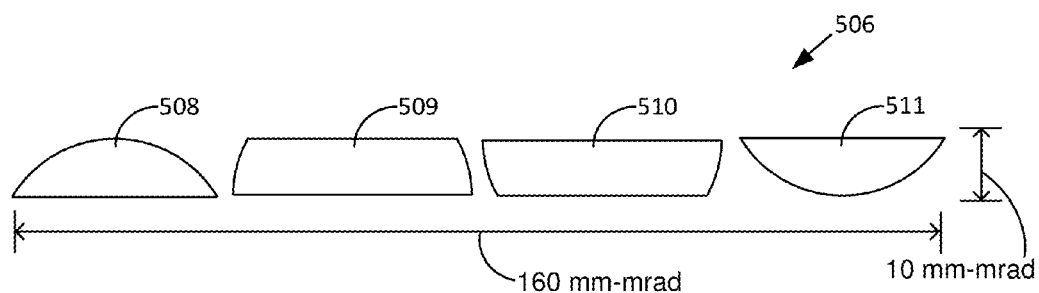
FIG. 5C
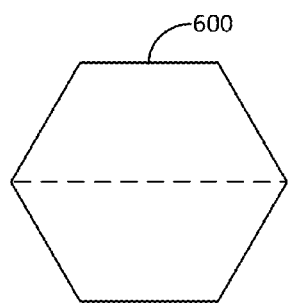 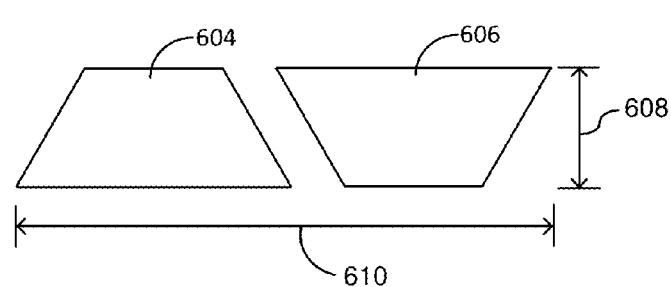
FIG. 6A  FIG. 6B

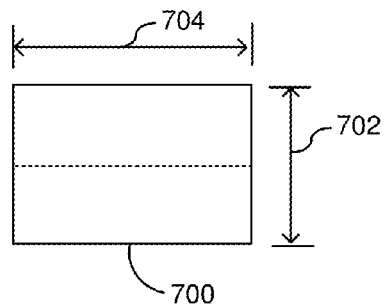
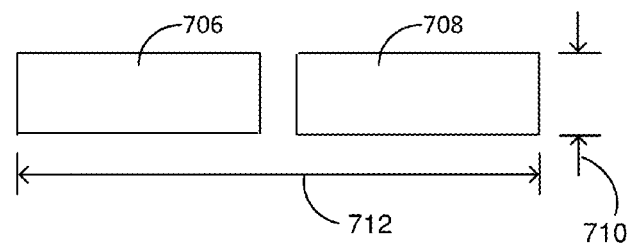
FIG. 7A　　　　　　　　　FIG. 7B
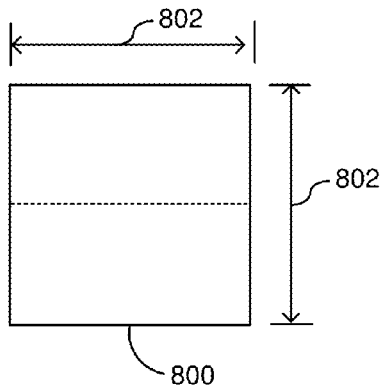
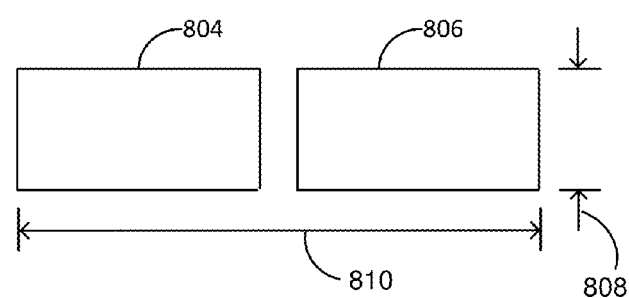
FIG. 8A　　　　　　　　　FIG. 8B
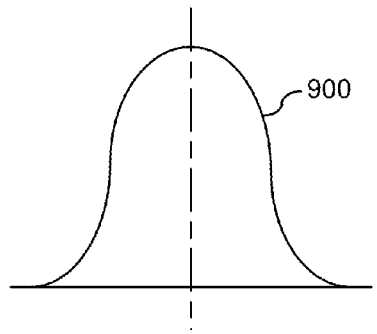
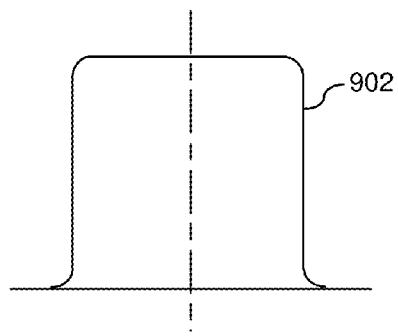
FIG. 9A　　　　　　　　　FIG. 9B

REVERSE INTERLEAVING FOR LASER LINE GENERATORS

CROSS REFERENCE TO RELATED APPLICATIONS

This application claims the benefit of U.S. Provisional Patent Application No. 62/269,794 that was filed Dec. 18, 2015, which is incorporated herein by reference in its entirety.

FIELD

This application relates to laser line beam generator systems.

BACKGROUND

Line beam systems often employ fiber-coupled laser sources, such as fiber-coupled diode laser packages housing a plurality of diode lasers situated to emit beams at high powers that become coupled into an output fiber of the package. Typically, laser line systems have highly asymmetric beam quality in the long and short dimensions, while traditional fiber-delivered systems use circular optical fibers. Several fiber-coupled diode laser modules, for example, can then be arranged to reach higher optical power levels, such as hundreds of watts to multiple kilowatts. However, adding fiber-coupled diode laser modules can scale costs considerably and can place limits on the characteristics of generated line beams. Thus, a need remains for improved line beam systems without various drawbacks.

SUMMARY

Various method and apparatus embodiments herein are directed to reverse interleaving for laser line beam systems. In some system designs, a desired line beam etendue in a short dimension can place a lower limit on the beam quality of a delivery fiber. When using circular fibers, an upper limit on fiber beam parameter product (bpp) can be determined by the width of the line in the short dimension. Such a fiber bpp can place a constraint on the amount of power available per fiber, requiring an increasing number of fibers as the power or length of the generated line beam is scaled.

According to some embodiments, apparatus include beam shearing optics situated to receive a collimated beam and to shear the collimated beam along a first direction so as to form a plurality of adjacent collimated beam portions, and homogenization optics situated to receive and homogenize the adjacent collimated beam portions along at least the first direction so as to produce a homogenized output beam. In some examples, the homogenized output beam has a length dimension along the first direction with an associated length beam parameter product (bpp) that is larger than a bpp of the collimated beam along the first direction and a width dimension along a second direction perpendicular to the first direction with an associated width bpp that is smaller than a bpp of the collimated beam along the second direction. In further examples, apparatus also include a fiber-coupled optical source situated to emit a fiber output beam with an associated predetermined fiber output beam bpp corresponding to the collimated beam bpps, collimation optics situated to receive the fiber output beam and to produce the collimated beam, and delivery optics situated to direct the homogenized output beam to a target.

According to other embodiments, methods include shearing a collimated beam having a beam parameter product (bpp) along an axis so as to form a plurality of sheared collimated beam portions, and arranging the sheared collimated beam portions adjacent to each other so that a line beam having a length and thickness that is formed with the light from the sheared collimated beam portions has a lower bpp associated with the line beam thickness than the bpp of the collimated beam along the axis. Some examples further include producing a fiber output beam with a fiber-coupled diode laser module including an output fiber situated to emit the fiber output beam and having a numerical aperture corresponding to the bpp of the collimated beam along the axis.

According to further embodiments, a method includes emitting a fiber output beam from a fiber-coupled optical source, collimating the fiber output beam to form a collimated beam having a selected diameter, shearing the collimated beam into a plurality of collimated beam portions, arranging the collimated beam portions adjacent to each other, homogenizing the adjacently arranged collimated beam portions to form a homogenized output beam, and directing the homogenized output beam to a target, wherein the homogenized output beam has a beam parameter product (bpp) across a selected dimension that is lower than a bpp of the fiber output beam.

The foregoing and other features and advantages of the disclosed technology will become more apparent from the following detailed description, which proceeds with reference to the accompanying figures.

BRIEF DESCRIPTION OF THE DRAWINGS

FIG. 1A is a schematic of a reverse interleaving system.

FIG. 1B-1D are cross-sectional views of beams associated with the reverse interleaving system of FIG. 1A.

FIG. 4A is a schematic of a further alternative beam shearing system.

FIG. 4B is another schematic of the alternative beam shearing system shown in FIG. 4A rotated by 90 degrees.

FIGS. 4C and 4D are cross-sectional views of beams associated with the schematic views of FIGS. 4A and 4B, respectively.

FIGS. 4E and 4F are ray model perspective views substantially corresponding to the schematic view of the FIGS. 4A and 4B, respectively.

FIG. 4G is a shaded beam intensity profile corresponding to the cross-section shown in FIG. 4C.

FIGS. 5A-5C show unsheared and sheared cross-sections of circular beam examples.

FIGS. 6A-8B show unsheared and sheared cross-sections of hexagonal, rectangular, and square beam examples.

FIGS. 9A and 9B shows graphs of beam intensity profiles for different beam examples.

DETAILED DESCRIPTION

Figure 2:
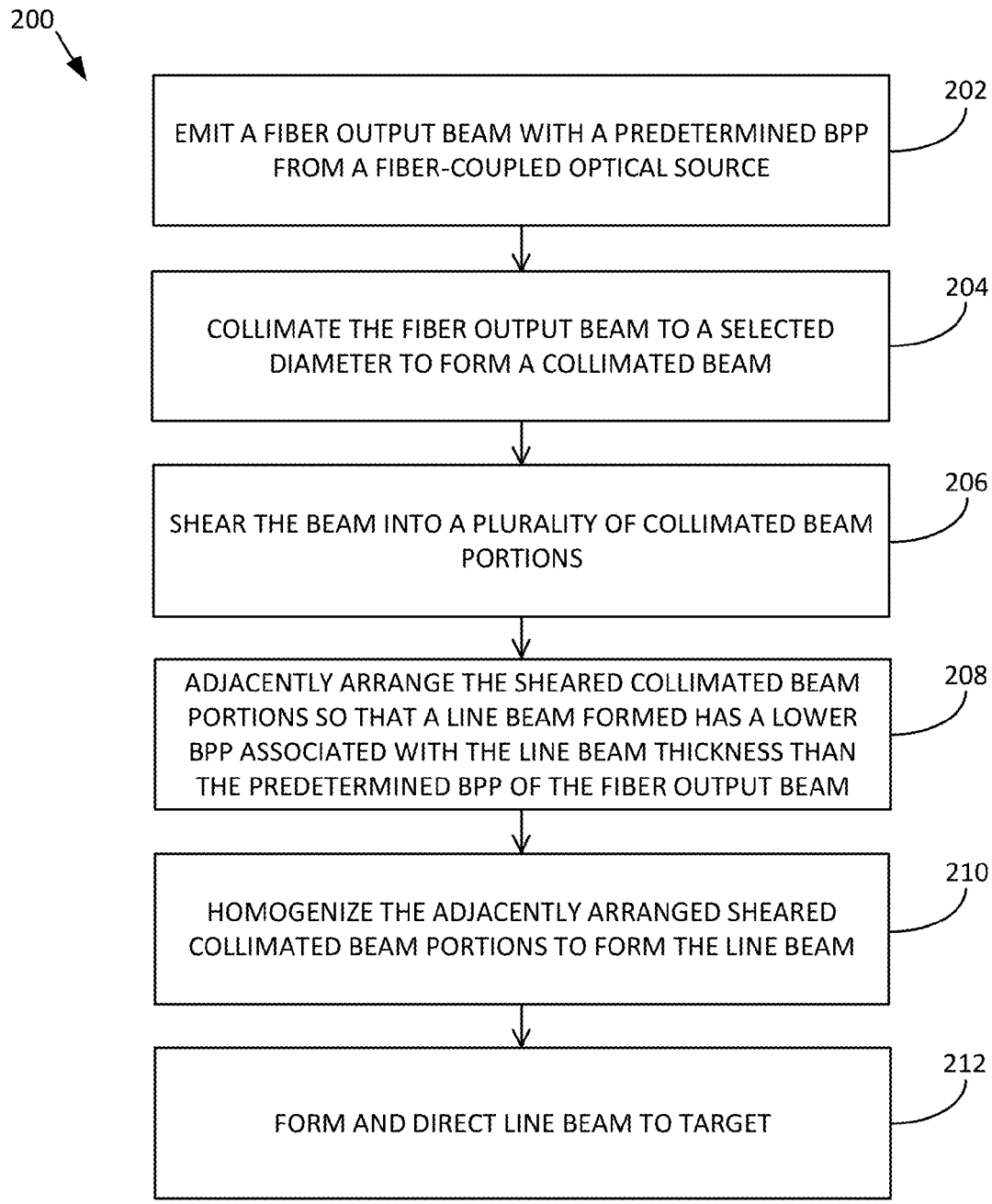
FIG. 2 is a flowchart of an example method of line beam formation.

FIG. 1A shows a reverse interleaving apparatus 100 that includes a fiber-coupled laser module 102 having an output optical fiber 104 that receives and propagates optical radiation generated by the fiber-coupled laser module 102. A numerical aperture (NA) of the output optical fiber 104 is defined by a core 106 and cladding 108 of the output optical fiber 104 and is associated with the characteristics of the optical radiation generated by the fiber-coupled laser module 102. In one example, a plurality of fiber-coupled laser modules 102 each couple about 100 W or more of infrared optical radiation into a respective 0.22 NA 400 µm core output optical fiber. It will be appreciated that various core sizes, core shapes, cladding sizes and shapes, fiber NAs, and optical powers, as well as different optical sources for generating the coupled radiation (e.g., fiber lasers), may be used.

The output optical fiber 104 emits a fiber output beam 110 having an NA corresponding to the NA of the output optical fiber 104. The fiber output beam 110 has a spot size corresponding to its diameter at the emitting end of the output optical fiber 104. The spot size and NA of the fiber output beam 110 generally provide it with a predetermined beam parameter product (bpp) along a selected transverse axis as the fiber output beam 110 is emitted from the output optical fiber 104. The fiber output beam 110 diverges and is received by collimation optics 112 situated to collimate and form a collimated beam 114 that propagates without substantial convergence or divergence. In representative examples, the collimated beam 114 has a bpp that is the same as or approximately the same as the predetermined bpp of the fiber output beam, though in some examples the bpp of the collimated beam can be different. In further examples, the fiber output beam 110 or the collimated beam 114 can have asymmetric divergences or bpps.

A first right angle prism 116 is situated to receive a portion of the collimated beam 114 so as to shear the collimated beam 114 along a shearing plane or axis to form a lower semi-circular collimated beam portion 118 and to reflect the lower semi-circular collimated beam portion 118 into a direction perpendicular to the collimated beam 114. A second right angle prism 120 is situated to receive an upper semi-circular collimated beam portion 122 and to reflect the upper semi-circular collimated beam portion 122 into a direction perpendicular to the collimated beam 114 and parallel to the lower semi-circular collimated beam portion 118. The first right angle prism 116 is generally situated lower, i.e., into the plane of FIG. 1A, than the second right angle prism 120 so as to allow the upper semi-circular collimated beam portion 122 to propagate past the first right angle prism 116. FIG. 1B shows a cross-sectional view of the lower and upper semi-circular collimated beam portions 118, 122 propagating adjacent to each other in the respective first and second right angle prisms 116, 120. In general, beam shearing can be effected with various combinations of reflective and refractive optical components, including reflectors, prisms, etc., so that one or more incident beams become sheared along one or more shearing planes or axes into additional beam components.

A jogging prism 124 is situated to receive the lower semi-circular collimated beam portion 118 and to reflect the lower semi-circular collimated beam portion 118 perpendicularly out of the plane of FIG. 1A and to reflect the lower semi-circular collimated beam portion 118 a second time perpendicularly to propagate parallel to the upper semi-circular collimated beam portion 122 and to form adjacently aligned collimated beam portions 126, 128. FIG. 1C shows a cross-sectional view of the lower and upper semi-circular collimated beam portions 118, 122 propagating parallel and adjacent to each other after the jogging prism 124. As shown in FIG. 1C, a top diameter line 130 of the adjacently aligned collimated beam portion 126 (associated with the shear axis) is approximately collinear with a tangent 132 at the top of the adjacently aligned collimated beam portion 128. Also, a tangent 134 at the bottom of the adjacently aligned collimated beam portion 126 is approximately collinear with a bottom diameter line 136 of the adjacently aligned collimated beam portion 128 (also associated with the shear axis). It will be appreciated that such alignments are not necessary in all embodiments, though in representative examples such alignments generally correspond with superior line beam performance across a line beam thickness dimension. As shown in FIG. 1A, the collimated beam portion 118 is redirected by the jogging prism 124, but in other examples, one or both of the beam portions 116, 118 can be directed with one or more prisms or other reflectors.

The adjacently aligned collimated beam portions 126, 128 are optically coupled to a homogenizing light pipe 137. In some examples, one or more focusing optics or diffusers 138 are situated to receive and optically couple the adjacently aligned collimated beam portions 126, 128 into the homogenizing light pipe 137. The homogenizing light pipe 137 produces a homogenized output beam 140 homogenized across at least one axis perpendicular to the direction of beam propagation. In some examples, the homogenized output beam 140 is homogenized across a direction parallel to the top and bottom diameter lines 130, 136 of the adjacently aligned semi-circular collimated beam portions 126, 128. In further examples, the homogenized output beam 140 is homogenized across the directions parallel and perpendicular to the top and bottom diameter lines 130, 136 of the adjacently aligned semi-circular collimated beam portions 126, 128. FIG. 1D shows a cross-sectional view of the homogenized output beam 140 that is homogenized across perpendicular axes 142, 144.

The homogenized output beam 140 is optically coupled to a line beam optical relay system 146 that forms a homogenized line beam 148 and directs the homogenized line beam 148 to a target 150, typically at or near a focus of the homogenized output beam 140. In some examples, the homogenized output beam 140 is directed to a target without the line beam optical relay system 146. In some embodiments, the line beam optical relay system 146 includes rotationally symmetric reimaging optics that are situated to reimage the output of the homogenizing light pipe 137 in the form of the homogenized output beam 140 at the target 150. In further embodiments, the line beam optical relay system 146 is anamorphic so as to change the aspect ratio of the homogenized output beam 140 by increasing or decreasing magnification (or both) to provide a length 'L' that is typically substantially greater than a thickness 'T' in the homogenized line beam 148. The bpp of the homogenized line beam 148 in the direction of the thickness 'T' is lower than the predetermined bpp provided by the fiber output beam 110 due to the shearing of the collimated beam 114 and the rearrangement of the corresponding collimated beam portions 118, 122. Conversely, the bpp of the homogenized line beam 148 in the direction of the length 'L' is higher than the predetermined bpp of the fiber output beam 110 due to the same shearing and rearranging. Since the bpp in the thickness direction of the homogenized line beam 148 is reduced by about a half, (or larger in some examples, including 55%, 60%, 65%, 75%, etc.) a more desirable line beam system can be created having an improved bpp in the thickness direction. Alternatively, the same bpp may be achieved in line beam systems using fewer optical fibers that deliver fiber output beams with larger NAs. In some examples, a predetermined bpp of the fiber output beam 110 is between about 30 and 50 mm-mrad (e.g., +/−10%), the bpp of the homogenized line beam 148 in the thickness direction is between 5 and 25 mm-mrad, and the bpp of the homogenized line beam 148 in the length direction is between about 60 and 300 mm-mrad. In general, homogenized line beam output power is scaled by increasing the number of collimated input beams and beam shearing prism arrangements.

In FIG. 2, a reverse interleaving method 200 is directed to forming a line beam that is typically scanned in relation to a target. At a method act 202, a fiber output beam is emitted from an optical fiber with a predetermined bpp that is typically not diffraction limited. The optical fiber can be coupled to a fiber-coupled optical source, such as a diode laser module, fiber laser, or other solid state laser. The fiber-coupled optical source generates one or more beams that are coupled into the optical fiber to provide the fiber output beam. In a method act 204, the fiber output beam is collimated to a selected diameter with collimation optics so as to form a collimated beam. The collimated beam is then sheared at a method act 206 into a plurality of sheared collimated beam portions. For example, a circular collimated beam can be sheared along a diameter forming opposing semi-circular sheared collimated beam portions. In additional examples, the collimated beam can be sheared into three or more sheared collimated beam portions. Various optical components can be used to shear the collimated beam, including but not limited to optical prism and mirror elements, among others.

At a method act 208, the sheared collimated beam portions are adjacently arranged so that a line beam can be formed, with a thickness of the line beam having a lower bpp than the predetermined bpp of the fiber output beam emitted at method act 202. In embodiments herein, the sheared collimated beam portions are adjacently arranged end to end along a length direction of the line beam to be formed. At a method act 210, the adjacently arranged sheared collimated beam portions are coupled into an optical homogenizer and are homogenized so as to provide optical cross-sectional uniformity. At a method act 212, the homogenized beam portions are then received by relay optics that form the line beam and direct the line beam to a target to be processed. In typical examples, line beam length dimensions at the target are substantially larger than line beam width dimensions, with length to width aspect ratios of 10:1, 100:1, 1000:1, or greater, being achieved.

Figure 3A:
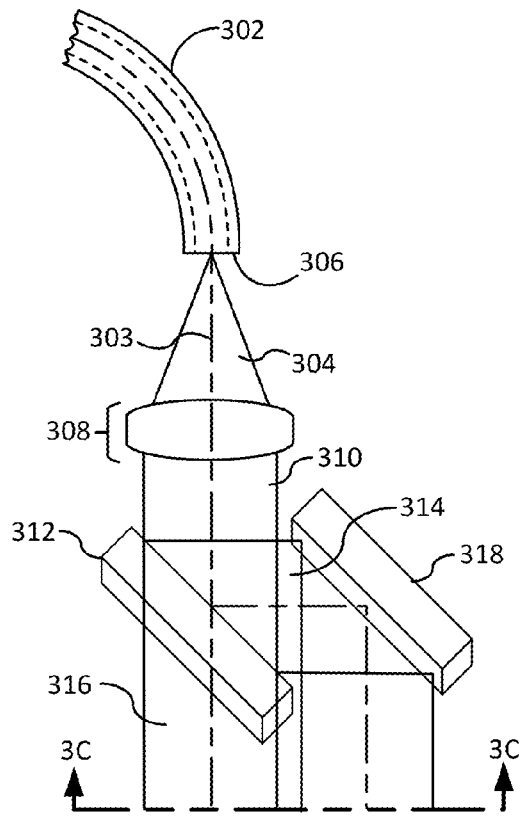
FIG. 3A is a schematic of an alternative beam shearing system.
Figure 3B:
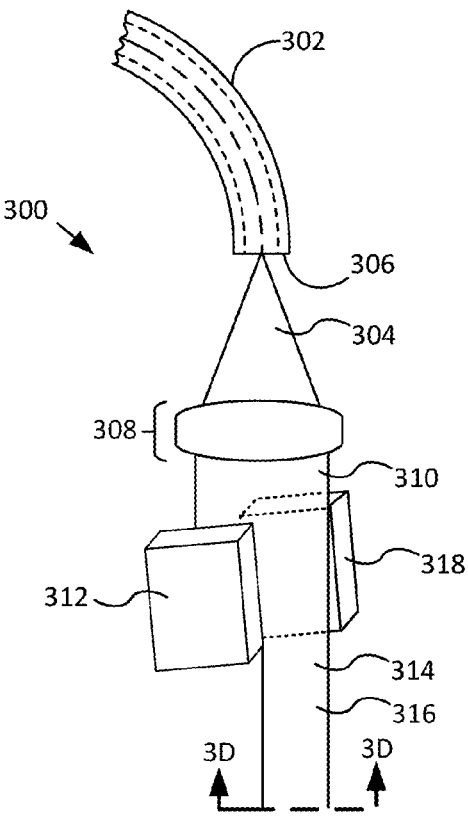
FIG. 3B is another schematic view of the alternative beam shearing system shown in FIG. 3A rotated by 90 degrees.

FIGS. 3A and 3B show an example of an alternative beam shearing system 300, with FIG. 3B showing the schematic view of FIG. 3A rotated by 90 degrees. The beam shearing system 300 includes an output optical fiber 302 providing a source optical beam 304 that generally diverges from an emission face 306 of the output optical fiber 302 with a predetermined NA associated with the NA of the output optical fiber 302 and generally centered about an optical axis 303 that is also associated with the output optical fiber 302. A collimation optical system 308 is situated to receive the diverging source optical beam 304 and to form a collimated optical beam 310. A first mirror 312 is situated in the optical path of the collimated optical beam 310 so as to receive a first collimated beam portion 314 of the collimated optical beam 310. A second collimated beam portion 316 is not redirected by the first mirror 312, and instead propagates past the first mirror 312, e.g., above the first mirror 312 in FIG. 3A (i.e., out of the plane of FIG. 3A) and to the right of the first mirror 312 in FIG. 3B. A second mirror 318 that is typically parallel or close to parallel to and spaced apart from the first mirror 312 is situated to receive the first collimated beam portion 314 after reflection from the first mirror 312.

Figure 3C:
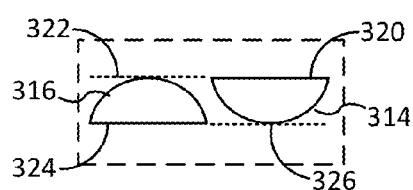
FIGS. 3C and 3D are cross-sectional views of beams associated with the schematic views of FIGS. 3A and 3B, respectively.
Figure 3D:
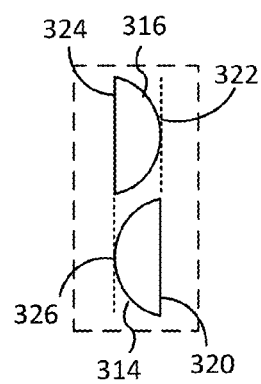
Figure 3E:
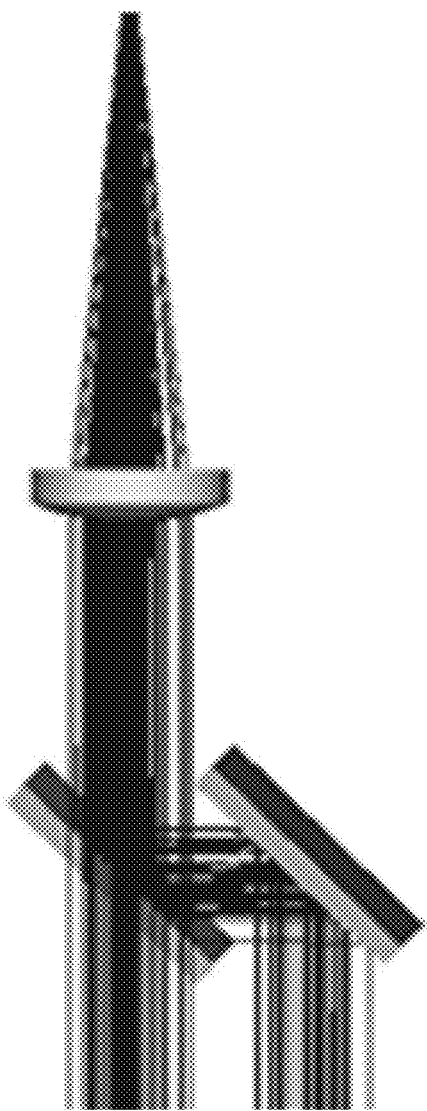
FIGS. 3E and 3F are ray model perspective views substantially corresponding to the schematic views of the FIGS. 3A and 3B, respectively.
Figure 3F:
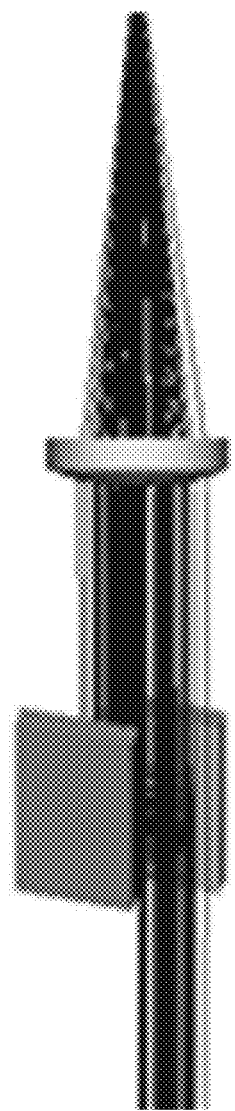
Figure 3G:
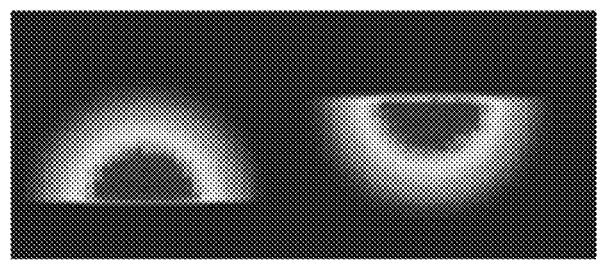
FIG. 3G is a shaded beam intensity profile corresponding to the cross-section shown in FIG. 3C.

The first and second mirrors 312, 318 are also tilted in relation to the optical axis 303 so that the first collimated beam portion 314 is reflected so as to propagate adjacent to the second collimated beam portion 316 after the first and second mirrors 312, 318. In FIGS. 3C and 3D, cross-sections of the propagating collimated beam portions 314, 316 from the system 300 as viewed from the respective perspectives of FIGS. 3A and 3B are shown. A diameter line 320 of the first collimated beam portion 314 is generally collinear with a tangent 322 of the adjacent second collimated beam portion 316. Also, a diameter line 324 of the second collimated beam portion 314 is generally collinear with a tangent 326 of the first collimated beam portion 316. A dimension of the collimated beam portions 314, 316 perpendicular to the diameter lines 320, 324 generally defines a thickness bpp that is lower than a length bpp defined by a dimension of the collimated beam portions 314, 316 parallel to the diameter lines 320, 324. The collimated beam portions 314, 316 can be homogenized subsequently in a light pipe or integrating prism in order to provide a line, rectangular, or other shaped beam with an increased bpp in a dimension of the shaped beam as compared with the bpp of the source optical beam 304.

FIGS. 4A and 4B show an alternative embodiment of a beam shearing system 400, with FIG. 4B showing the schematic view of FIG. 4A rotated by 90 degrees. The beam shearing system 400 includes an output optical fiber 402 situated to emit a system output beam 404 with a predetermined NA and bpp from an emitting end 406 of the output optical fiber 402 along a propagation axis 408. The system output beam 404 is received by a collimation lens 410 that collimates the system output beam 404 to form a collimated beam 412. A monolithic flat-flat substrate 414 is situated to receive the collimated beam 412 through an input surface 416. The collimated beam 412 propagates inside the substrate 414 and becomes sheared through internal reflection off a first reflective surface 420 to form a first collimated beam portion 418 (shown internally in FIGS. 4A and 4B). The first collimated beam portion 418 is internally reflected a second time off a second reflective surface 422 that is parallel to the first reflective surface 420. A second collimated beam portion 424 propagates inside the substrate 414 and does not become sheared and instead propagates through the substrate and exits the substrate 414 adjacent to the first collimated beam portion 418 through an exit surface 426. In representative examples, the first and second reflective surfaces 420, 422 provide reflectivity through the selective application of a reflective coating to the surfaces of the flat-flat substrate 414.

The substrate 414 is situated with respect to the incident collimated beam 412 at a tilt angle with respect to the propagation axis 408 so that the first and second collimated beam portions 418, 424 propagate adjacent to each other after the propagating through and past the substrate 414. For example, FIGS. 4C and 4D show cross-sections of the first and second collimated beam portions 418, 424 having exited the substrate 414. A diameter line 428 of the first collimated beam portion 418 is aligned with a tangent 430 of the adjacent second collimated beam portion 424, and a diameter line 432 of the second collimated beam portion 424 that is parallel to the diameter line 428 is aligned with a tangent 434 of the first collimated beam portion 418. A half-diameter width of the collimated beam portions 418, 424 perpendicular to the diameter lines 428, 432 generally defines a thickness bpp that is lower than a length bpp defined by a full-diameter width or larger of the collimated beam portions 418, 424 parallel to the diameter lines 428, 432. In some examples, the collimated beam portions 418, 424 can be homogenized subsequently in a light pipe or integrating prism in order to provide a line, rectangular, or other shaped beam with a uniform intensity profile across one or more directions perpendicular to the direction of propagation. A shaped beam that is formed with the uniform intensity profile can have an increased bpp in a dimension of the shaped beam as compared with the bpp of the source optical beam 404. In some examples, the uniform intensity profile can be along an axis parallel to the dimension of the shaped beam with an increased bpp. In representative examples, a beam with a uniform intensity profile has an intensity across at least one axis perpendicular to the direction of propagation between opposite beam boundaries that is within 2%, 5%, or 10% of an average intensity of the beam. In further examples, uniformity is within about 25% of an average intensity of the beam.

FIGS. 5A and 5B show a circular beam 500 having a selected intensity profile, such as Gaussian, super-Gaussian, top-hat, etc., and a predetermined bpp associated with a fiber that emits the circular beam 500. In some examples, the circular beam 500 is emitted from a 400 μm (core) diameter, 0.2 NA, optical fiber with a corresponding bpp of 40 mm-mrad. In FIG. 5B, the circular beam 500 is shown after it has been collimated, sheared, and jogged into a pair of collimated beam portions 502, 504 that propagate adjacent to each other. The collimated beam portions 502, 504 have a bpp of 20 mm-mrad along a first dimension and 80 mm-mrad in a second dimension perpendicular to the first dimension. FIG. 5C shows another example where the circular beam 500 is similarly emitted, but it is collimated, sheared, and arranged into a linear array 506 of four adjacent collimated beam portions 508, 509, 510, and 511, respectively. The linear array 506 has a corresponding bpp of about 10 mm-mrad along a first dimension and a bpp of about 160 mm-mrad along a second dimension longer than and perpendicular to the first dimension.

In another example, as shown in FIG. 6A, a hexagonal beam 600 is emitted from an optical fiber and has a corresponding NA and bpp 602. As shown in FIG. 6B, the hexagonal beam 600 can be collimated, sheared, and arranged into a pair of adjacent sheared collimated beam portions 604, 606. The corresponding bpp along a short dimension 608 is about half the bpp 602 and the corresponding bpp along a long dimension 610 is about twice the bpp 602 depending on the orientation of the hexagonal sheared collimated beam portions 604, 606 and their position relative to each other. In some embodiments, the hexagonal beam 600 can be sheared across a dimension perpendicular to a set of parallel sides.

In a further example in FIG. 7A, a rectangular beam 700 is shown in cross-section as it is emitted from an optical fiber and has a corresponding NA, core diameter, and a resulting bpp 702 along a vertical dimension and a resulting bpp 704 along a horizontal dimension. As shown in FIG. 7B, the rectangular beam 700 can be collimated, sheared, and arranged into a pair rectangular collimated beam portions 706, 708 arranged end to end. A corresponding bpp in a vertical dimension 710 is about half the bpp 702 and a corresponding bpp in a horizontal dimension 712 is about twice the bpp 704.

In a further example in FIG. 8A, a square beam 800 is shown in cross-section as it is emitted from an optical fiber having a square-shaped core so as to provide the square beam with a particular spot size and a bpp 802. As shown in FIG. 8B, the square beam 800 is collimated, sheared, and shifted to form a pair of adjacent square collimated beam portions 804, 806 each having a rectangular shape. The arranged beam portions 804, 806 define a width dimension 808 having a bpp that is about half the bpp 802 and length dimension 810 that is about twice the bpp 802.

FIG. 9A shows a first graph of a beam intensity profile 900 having a Gaussian shape. FIG. 9B shows a second graph of a beam intensity profile 902 having a uniform top-hat shape. In various examples, beams that are sheared can have Gaussian, top-hat, or other intensity profiles. For example, optical fibers or other waveguides that can provide corresponding beams which are to be sheared can also provide the beams with different intensity profiles, such as uniform ones.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Representative embodiments are described with reference to optical fibers with circular cores, but other types of optical waveguides can be used, including flexible optical fibers and rigid waveguide structures, having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

As used herein, numerical aperture (NA) refers to a largest angle of incidence with respect to a propagation axis defined by an optical waveguide for which propagating optical radiation is substantially confined. In optical fibers, fiber cores and fiber claddings can have associated NAs, typically defined by refractive index differences between a core and cladding layer, or adjacent cladding layers, respectively. While optical radiation propagating at such NAs is generally well confined, associated electromagnetic fields such as evanescent fields typically extend into an adjacent cladding layer. In some examples, a core NA is associated with a core/inner cladding refractive index, and a cladding NA is associated with an inner cladding/outer cladding refractive index difference. For an optical fiber having a core refractive index $n_{core}$ and a cladding index $n_{clad}$, a fiber core NA is $NA=\sqrt{n_{core}^2-n_{clad}^2}$. For an optical fiber with an inner core and an outer core adjacent the inner core, a cladding NA is $NA=\sqrt{n_{inner}^2-n_{outer}^2}$, wherein $n_{inner}$ and $n_{outer}$ are refractive indices of the inner cladding and the outer cladding, respectively. Optical beams as discussed above can also be referred to as having a beam NA which is associated with a beam angular radius. While multi-core step index fibers are described below, gradient index designs can also be used.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

The term brightness is used herein to refer to optical beam power per unit area per solid angle. In some examples, optical beam power is provided with one or more laser diodes that produce beams whose solid angles are proportional to beam wavelength and beam area. Selection of beam area and beam solid angle can produce pump beams that couple selected pump beam powers into one or more core or cladding layers of double, triple, or other multi-clad optical fibers. Beams can be described using line boundaries that generally correspond to a zero intensity value, a 1/e value, a $1/e^2$ value, a full-width half-maximum (FWHM) value, or other suitable metric, such as a beam position where an intensity uniformity begins to taper.

Optical beams and optical elements are described in some examples with respect to one or more axes. Typically, an axis includes one or more straight line segments along which an optical beam propagates or along which one or more optical elements are situated. Such axes can be bent or folded with reflective surfaces, so that axes need not be single straight line segments. In some examples, reflective surfaces defined by internal reflection in one or more prisms are used, but such reflective surfaces can be provided as reflective surfaces such as dielectric or metallic coatings. In addition, rhomboidal prisms are used in the examples for convenient illustration. As used herein, a rhomboidal prism is a solid having two sets of parallel optical surfaces, with the optical surfaces of each set at an angle of 45 degrees with respect to the surfaces of the other set. In some cases, polarization dependent coatings are used to separate s- and p-polarization components of optical beams, typically as part of a polarizing beam splitter. Light guides are used to reduce beam coherence. As used herein, light guides include light pipes of circular, rectangular or other cross-section. Light guides can be light pipes having a cavity in which beams propagate, but other types of light guides such as rod integrators or other beam homogenizers can be used. To form line beams, laser beams in a common plane or forming a narrow sheet are directed into a rectangular or square light pipe so as to be reflected by the light pipe while remaining substantially in the common plane or within the narrow sheet.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. An apparatus, comprising:
   beam shearing optics situated to receive an input collimated beam having an input cross-sectional area and to shear the input collimated beam along a shearing plane that separates a first area portion of the input cross-sectional area of the input collimated beam into a first collimated beam portion and a second area portion of the input cross-sectional area separate from the first area portion into a second collimated beam portion adjacent to the first collimated beam portion, wherein the adjacent collimated beam portions have respective cross-sectional areas that sum to the cross-sectional area of the input collimated beam; and
   homogenization optics situated to receive and homogenize the received adjacent collimated beam portions along at least a first direction to produce a homogenized output beam.

2. The apparatus of claim 1, wherein the homogenized output beam has a length dimension along the first direction with an associated length beam parameter product (bpp) that is larger than a bpp of the collimated beam along the first direction and a width dimension along a second direction perpendicular to the first direction with an associated width bpp that is smaller than a bpp of the collimated beam along the second direction.

3. The apparatus of claim 2, further comprising:
a fiber-coupled optical source situated to emit a fiber output beam with an associated predetermined first and second fiber output beam bpps corresponding to the collimated beam bpps;
collimation optics situated to receive the fiber output beam and to produce the collimated beam; and
delivery optics situated to direct the homogenized output beam to a target.

4. The apparatus of claim 3, wherein the fiber-coupled optical source includes an optical fiber emitting end situated to emit the fiber output beam and includes a core and a cladding surrounding the core so as to define an optical fiber numerical aperture and a beam spot size at the optical fiber emitting end.

5. The apparatus of claim 4, wherein the fiber output beam has a circular, square, rectangular, or polygonal shape.

6. The apparatus of claim 1, wherein the beam shearing optics include at least first and second beam shearing prisms, wherein the first beam shearing prism is situated to receive the first area portion of the input collimated beam based on a shearing axis defined along the first direction and the second beam shearing prism is situated to receive the second area portion of the input collimated beam.

7. The apparatus of claim 6, wherein the beam shearing optics include a beam jogging prism situated to receive one of the first or second area portions and to reflect and jog the one area portion so that a side of the one area portion corresponding to the shearing axis is approximately aligned with a parallel tangent of the other area portion that is parallel to the shearing axis.

8. The apparatus of claim 1, wherein the beam shearing optics include a pair of mirrors tilted in relation to an optical axis of the collimated beam and are situated to form at least one of the collimated beam portions.

9. The apparatus of claim 1, wherein the beam shearing optics include a monolithic flat-flat substrate with reflective mirror surfaces on opposite sides of the substrate that are tilted in relation to an optical axis of the collimated beam and that are situated to form at least one of the collimated beam portions.

10. The apparatus of claim 3, wherein the width bpp is less than or equal to three fifths of the first or second fiber output beam bpps.

11. A method, comprising:
shearing an input collimated beam having a beam parameter product (bpp) along an axis to separate a first portion of the cross-sectional area of the input collimated beam and a second portion of the cross-sectional area of the input collimated beam separate from the first portion into respective first and second sheared collimated beam portions having respective cross-sectional areas that sum to the cross-sectional area of the input collimated beam; and
arranging the sheared collimated beam portions adjacent to each other so that a line beam having a length and thickness that is formed with the light from the sheared collimated beam portions has a lower bpp associated with the line beam thickness than the bpp of the input collimated beam along the axis.

12. The method of claim 11, further comprising producing a fiber output beam with a fiber-coupled diode laser module including an output fiber situated to emit the fiber output beam and having a numerical aperture corresponding to the bpp of the input collimated beam along the axis.

13. The method of claim 12, further comprising collimating the fiber output beam with a collimation optic optically coupled to the output fiber so as to form the input collimated beam to be sheared.

14. The method of claim 11, further comprising homogenizing the sheared collimated beam portions along a direction corresponding to the length of the line beam.

15. The method of claim 14, further comprising directing the homogenized sheared collimated beam portions so as to form the line beam at an illumination plane.

16. The method of claim 11, further comprising homogenizing the sheared collimated beam portions along a direction corresponding to the length of the line beam and along a direction corresponding to the width of the line beam.

17. The method of claim 11, wherein the input collimated beam has a circular, square, rectangular, or polygonal shape.

18. The method of claim 11, wherein the shearing includes shearing the input collimated beam with a plurality of beam shearing prisms, each beam shearing prism situated to receive a cross-sectional portion of the input collimated beam separate from each other shearing prism so that each cross-sectional portion corresponds to one of the sheared collimated beam portions.

19. The method of claim 11, wherein the input collimated beam has a uniform intensity profile along one or more axes perpendicular to the direction of propagation of the collimated beam.

20. A method, comprising:
emitting a fiber output beam from a fiber-coupled optical source;
collimating the fiber output beam to form a collimated beam having a selected diameter;
shearing the collimated beam to separate different area portions of the cross-sectional area of the collimated beam into a plurality of collimated beam portions having respective cross-sectional areas that sum to the cross-sectional area of the collimated beam;
arranging the collimated beam portions adjacent to each other;
homogenizing the adjacently arranged collimated beam portions to form a homogenized output beam; and
directing the homogenized output beam to a target;
wherein the homogenized output beam has a beam parameter product (bpp) across a selected dimension that is lower than a bpp of the fiber output beam.

* * * * *